United States Patent

Kumano

[11] Patent Number: 5,978,754
[45] Date of Patent: *Nov. 2, 1999

[54] TRANSLATION DISPLAY APPARATUS AND METHOD HAVING DESIGNATED WINDOWS ON THE DISPLAY

[75] Inventor: Akira Kumano, Chiba-ken, Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/709,544

[22] Filed: Sep. 6, 1996

[30] Foreign Application Priority Data

Sep. 8, 1995 [JP] Japan .................................. 7-231621

[51] Int. Cl.$^6$ ...................................................... G06F 17/28
[52] U.S. Cl. .................................. 704/3; 704/5; 345/333
[58] Field of Search .................................. 704/1, 2, 3, 4, 704/5, 6, 7, 10; 434/157, 167, 169; 345/333

[56] References Cited

U.S. PATENT DOCUMENTS

| | | | |
|---|---|---|---|
| 4,894,779 | 1/1990 | Suzuki et al. | 704/2 |
| 5,005,127 | 4/1991 | Kugimiya et al. | 704/5 |
| 5,091,876 | 2/1992 | Kumano et al. | 704/3 |
| 5,222,160 | 6/1993 | Sakai et al. | 382/185 |
| 5,251,130 | 10/1993 | Andrews et al. | 704/3 |
| 5,275,569 | 1/1994 | Watkins | 434/157 |
| 5,276,616 | 1/1994 | Kuga et al. | 704/10 |
| 5,351,189 | 9/1994 | Doi et al. | 704/3 |

OTHER PUBLICATIONS

"As–Reader", (Document Reader for Toshiba Machine Translation System) Toshiba Corp., pp. 36–40, 1994.

*Primary Examiner*—Joseph Thomas
*Attorney, Agent, or Firm*—Finnegan, Henderson, Farabow, Garrett & Dunner, LLP

[57] ABSTRACT

In a translation display apparatus, a display section displays a plurality of original sentences of a first language. A user designates an area of the original sentences to be translated on the display through a translation area designation section. An area extraction section extracts the original sentences in the area designated by the translation area designation section. A translation section translates the original sentence extracted by the area extraction section from the first language to a second language. The display section displays the translated sentences translated by the translation section in the area designated by the translation area designation section.

17 Claims, 9 Drawing Sheets

```
tar archives and extracts files to and from a
single file called a tarfile.  A tarfile is
usually a magnetic tape, but it can be any file.
```
tar's actions are controlled by the key argument.
The key is a string of characters containing
exactly one function letter (c, r, t, u, or x)
and one or more function modifiers, depending
on the function letter used. Other arguments to
the command are filenames (or directory names)
specifying which files are to be archived or
extracted. In all cases, appearance of a directory
name refers to the files and (recursively)
subdirectories of that directory.

```
tarは、複数のファイルをtarfileと呼ばれる1つのファイルに
保管したり、抽出したりします。通常、tarfileは磁気テープ
ですが、その他のファイルであってもかまいません。
```

— 32 tar's actions are controlled by the key argument.
The key is a string of characters containing
exactly one function letter (c, r, t, u, or x)
and one or more function modifiers, depending
on the function letter used. Other arguments to
the command are filenames (or directory names)
specifying which files are to be archived or
extracted. In all cases, appearance of a directory
name refers to the files and (recursively)
subdirectories of that directory.

```
     1         10         20         32              47
  ┌─────────────────────────────────────────────────────┐
1 │ tar archives and extracts files to and from a       │
2 │ single file called a tarfile.  A tarfile is         │
3 │ usually a magnetic tape. but it can be any file.    │
4 │ tar's actions are controlled by the key argument.   │
5 │ The key is a string of characters containing        │
  │ exactly one function letter (c, r, t, u, or x)      │
  │ and one or more function modifiers, depending       │
  │ on the function letter used. Other arguments to     │
  │ the command are filenames (or directory names)      │
  │ specifying which files are to be archived or        │
  │ extracted. In all cases, appearance of a directory  │
  │ name refers to the files and (recursively)          │
  │ subdirectories of that directory.                   │
  │ ..........                                          │
  │ ..........                                          │
  └─────────────────────────────────────────────────────┘
```

FIG. 6A

```
 1                                                   33
┌─────────────────────────────────────────────────────┐
│ tarは、複数のファイルをtarfileと呼ばれる１つのファイルに│
├─────────────────────────────────────────────────────┤
 34                              48 49             64
│ 保管したり、抽出したりします。通常、tarfileは磁気テープ│
├─────────────────────────────────────────────────────┤
 65                                              88
│ ですが、その他のファイルであってもかまいません。 ────── │
└─────────────────────────────────────────────────────┘
```

FIG. 6B

| SENTENCE NUMBER | ORIGINAL SENTENCE | | CHARACTER POSITION OF TRANSLATION SENTENCE |
|---|---|---|---|
| | LINE NUMBER | CHARACTER POSITION | |
| 1 | 1 | 1 | 1 |
| 2 | 2 | 32 | 49 |
| 3 | 4 | 1 | 89 |
| ⋮ | ⋮ | ⋮ | ⋮ |

# TRANSLATION DISPLAY APPARATUS AND METHOD HAVING DESIGNATED WINDOWS ON THE DISPLAY

BACKGROUND OF THE INVENTION

1. Field of the Invention

The present invention relates to a translation display apparatus and method for translating natural language text from a first language to a second language using a computer.

2. Description of the Related Art

In the field of natural language processing techique using a computer, a machine translation apparatus for translating document from a first language (for example, English) to a second language (for example, Japanese) has been used.

Conventionally, the machine translation apparatus is used as a support system for effectively translating a large volume of documents. First, a large number of orignal sentences in the first language (for example, in English) are inputted to the machine translation apparatus. Then, the large number of original sentences are translated into the secord language (for example, Japanese) by unit of sentence order in sequence. However, it often happens that a user wants the translation of only a few sentences corresponding to a few original sentence after the large number of original sentences are inputted to the machine translation apparatus. In this conventional case, first, the large number of original sentences are displayed on an original sentence area of the display, where the display area consists of an original sentence area, a translated sentence area, and a command menu area. Then, the user traces one original sentence selected to be translated by using a mouse or pointing device, and designates a translation command by selecting from the menu. The selected original sentence (English) is processed by the machine translation program and translated to a translated sentence (Japanese). Last, the translated sentence is displayed on the translated sentence area of the display. In this conventional apparatus, there are two problems.

As a first problem, in the case of selecting the original sentence to be translated, the user must trace the original sentence exactly on the display and designate the translation command. In short, the user must input two kinds of operation. These operations impose a significant burden on the user.

As a second problem, the translation is displayed in the translated sentence area, which is in a different position from the original sentence area on the display. Accordingly, the user must move his viewpoint from the original sentence area to the translated sentence area and the user's eyes become tired while viewing the display.

SUMMARY OF THE INVENTION

It is an object of the present invention to provide a translation display apparatus and method for the user to operate with a minimal number of designating operations.

It is another object of the present invention to provide a translation display apparatus and method for the user in which eye fatigue is minimized.

According to the present invention, there is provided a translation display apparatus, comprising: display means for displaying a plurality of original sentences of a first language; translation area designation means for designating an area of the displayed original sentences to be translated on said display means; area extraction means for extracting one of the original sentences in the area designated by said translation area designation means; and translation means for translating the extracted original sentence from the first language to a second language; wherein said display means displays the translated sentence in the area designated by said translation area designation means.

Further in accordance with the present invention, there is provided a translation display apparatus, comprising: display means for displaying a plurality of original sentences of a first language; translation area designation means for designating an area of the displayed original sentences to be translated on said display means; extraction means for extracting the plurality of original sentences displayed on said display means; and translation means for translating the plurality of original sentences extracted by said extraction means from the first language to a second language; wherein said display means extracts a translated sentence corresponding to one of the original sentences in the area designated by said translation area designation means from all translated sentences translated by said translation means, and displays the extracted translated sentence in the designated area.

Further in accordance with the present invention, there is provided a method for displaying a translated sentence, comprising the steps of: displaying a plurality of original sentences of a first language; designating an area of the displayed original sentences; extracting one of the original sentences in the designated area; translating the extracted original sentence from the first language to a second language; and displaying the translated sentence in the area designated in the designating step.

Further in accordance with the present invention, there is provided a method for displaying a translated sentence, comprising the steps of: displaying a plurality of original sentences of a first language; designating an area of the displayed original sentences; extracting the displayed plurality of original sentences; translating the plurality of original sentences extracted at the extracting step from the first language to a second language; extracting one of the translated sentences corresponding to the original sentence in the designated area from all translated sentences translated at the translating step; and displaying the extracted translated sentence in the designated area.

Further in accordance with the present invention, there is provided a computer-readable memory comprising: instruction means for causing a computer to display a plurality of original sentences of a first language; instruction means for causing a computer to designate an area of the displayed original sentence; instruction means for causing a computer to extract one of the original sentences in the designated area; instruction means for causing a computer to translate the extracted original sentence from the first language to a second language; and instruction means for causing a computer to display the translated sentence in the designated area.

Further in accordance with the present invention, there is provided a computer-readable memory comprising: instruction means for causing a computer to display a plurality of original sentences of a first language; instruction means for causing a computer to designate an area of the displayed original sentences; instruction means for causing a computer to extract the displayed plurality of original sentences; instruction means for causing a computer to translate the extracted plurality of original sentences from the first language to a second language; instruction means for causing a computer to extract one of the translated sentences corresponding to the original sentence in the designated area from all translated sentences; and instruction means for causing a computer to display the extracted translated sentence in the designated area.

DETAILED DESCRIPTION OF THE PREFERRED EMBODIMENTS

Embodiments of the present invention are described below with reference to the drawings.

Figure 1:
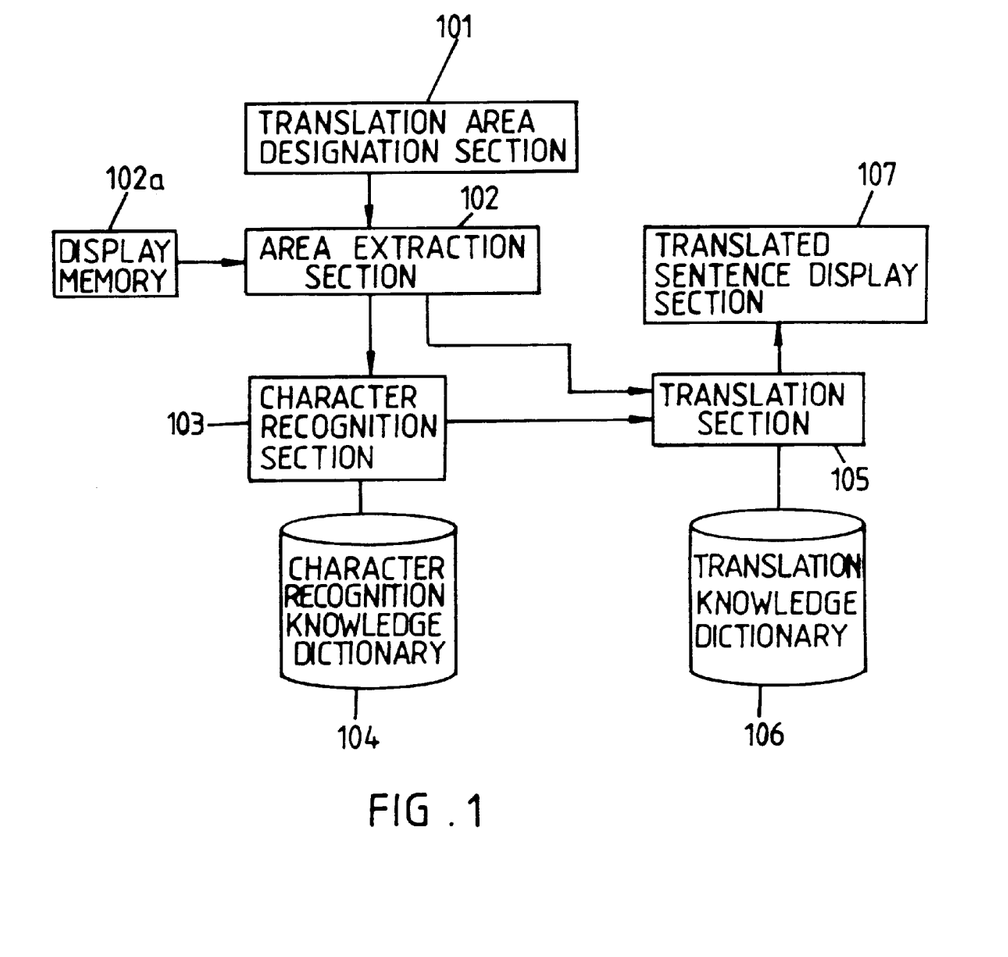
FIG. 1 shows a schematic diagram according to a first embodiment of the present invention.

FIG. 1 is a schematic diagram of machine translation apparatus according to the first embodiment of the present invention. In this embodiment, an example of translation processing from English to Japanese will be explained. As shown in FIG. 1, the translation apparatus includes of a translation area designation section 101, an area extraction section 102, a display memory 102a, a character recognition section 103, a character recognition knowledge dictionary 104, a translation section 105, a translation knowledge dictionary 106 and a translated sentence display section 107.

The translation area designation section 101 inputs the area of the original sentences to be translated from all of the original sentences on the display. For example, the user designates the area to be translated through an input device (not shown), i.e., mouse or keyboard. The translation area designation section 101 inputs the area according to the user's designation and supplies the area to the area extraction section 102. The area may be a part of display content (image, text). The area extraction section 102 extracts the content of the area from the display memory 102a according to the area supplied by the translation area designation section 101. In case the display memory 102a stores text data (character code) which is displayed, the character code of the area is supplied to the translation section 105. In case the display memory 102a stores image data (bit pattern) which is displayed, the image data is supplied to the character recognition section 103. The character recognition section 103 extracts the character part from the image data and recognizes the character part using the character recognition knowledge dictionary 104. Then, the recognition result as character code is supplied to the translation section 105. The character recognition knowledge dictionary 104 stores dictionary data (character recognition knowledge) to detect the character part and to recognize characters. For example, a standard pattern for each character to be recognized is registered in case of pattern-matching. The translation section 105 translates the text data (character codes) supplied by the area extraction section 102 or the character recognition section 103 into Japanese using the translation knowledge dictionary 106 and outputs the translated sentence to the translated sentence display section 107. If the area extracted by the area extraction section 102 includes a part of a word or a part of a sentence (which, for example, may occur if a boundary of the area divides one sentence /word into parts on the display), the character code supplied to the translation section 105 is grammatically incomplete and it is not translated correctly. In this case, as for the character code, a position of the start point or end point of the sentence is searched in the area preceding and following the boundary of the area, and complete one sentence is extracted to be translated.

The translated sentence display section 107 displays the translated sentence in the area designated by the translation area designation section 101. If the length of the translated sentence (Japanese) is larger than a length of the original sentence (English), character size or character spacing is changed in order to display all of the translated sentence in the area.

Figure 2:
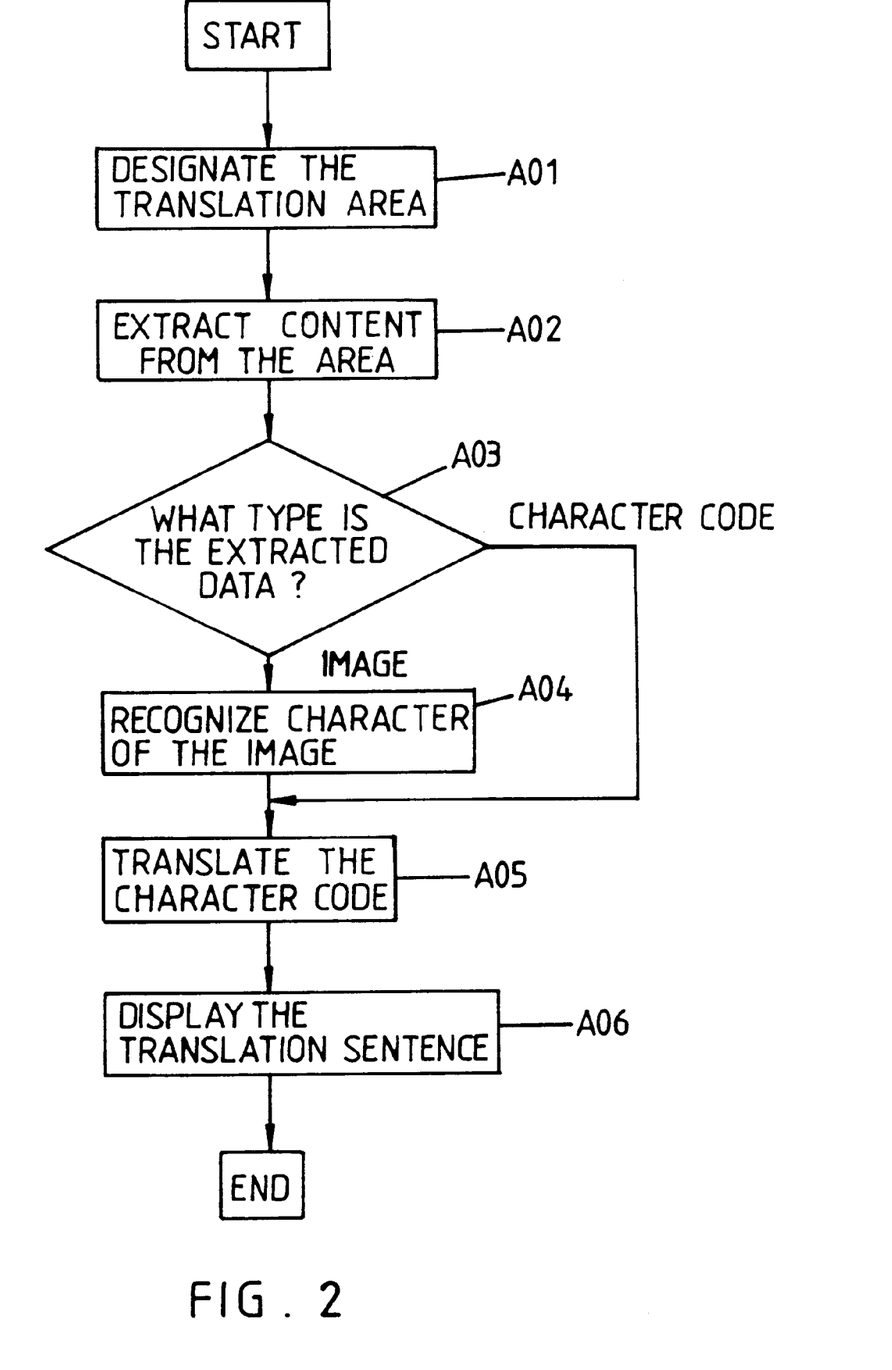
FIG. 2 shows a flow chart of processing according to the first embodiment of the present invention.
Figure 3A:
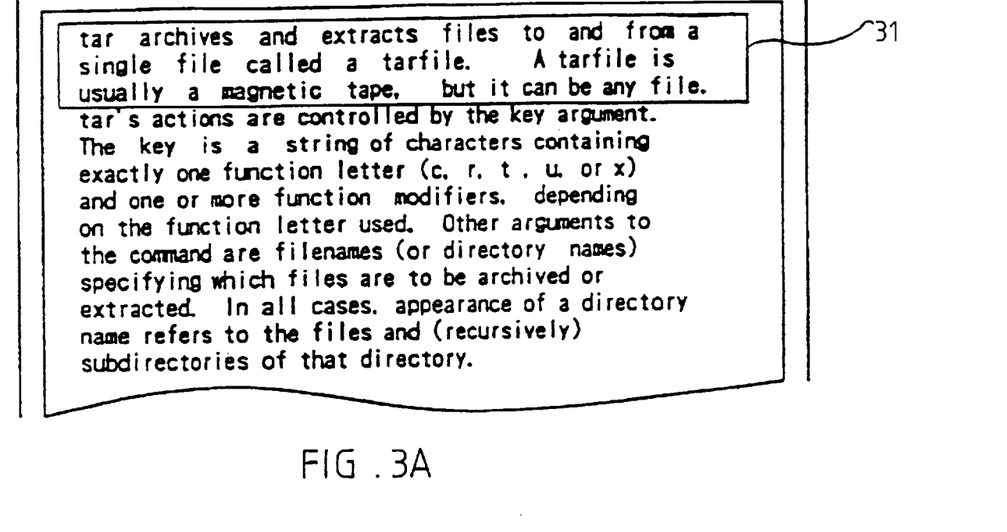
FIG. 3A shows one example of a display of an original sentence area.
Figure 3B:
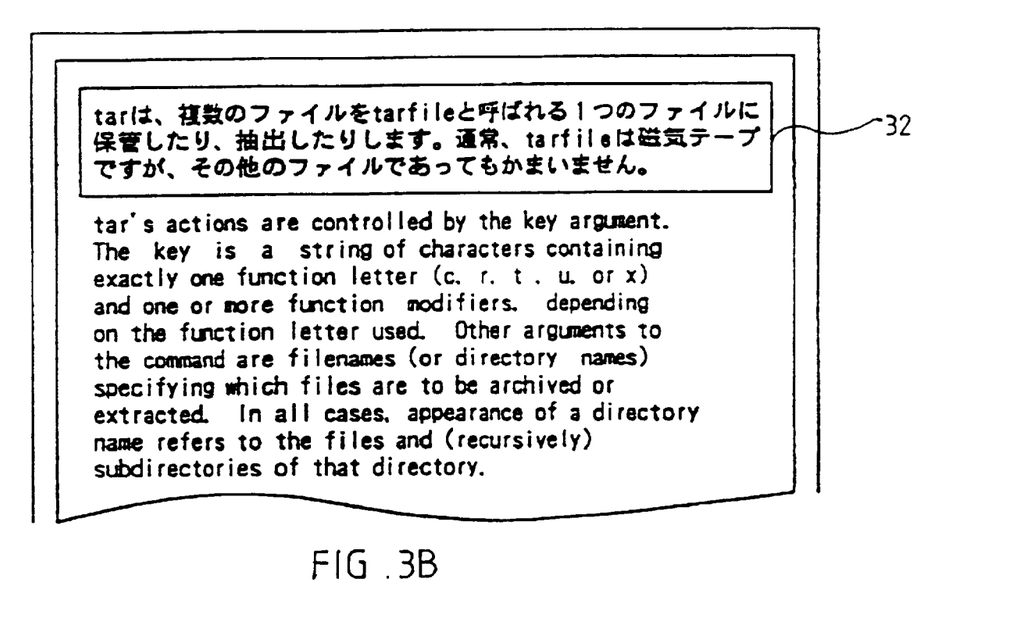
FIG. 3B shows one example of a display of the original sentence area including a translated sentence area.
Figure 4A:
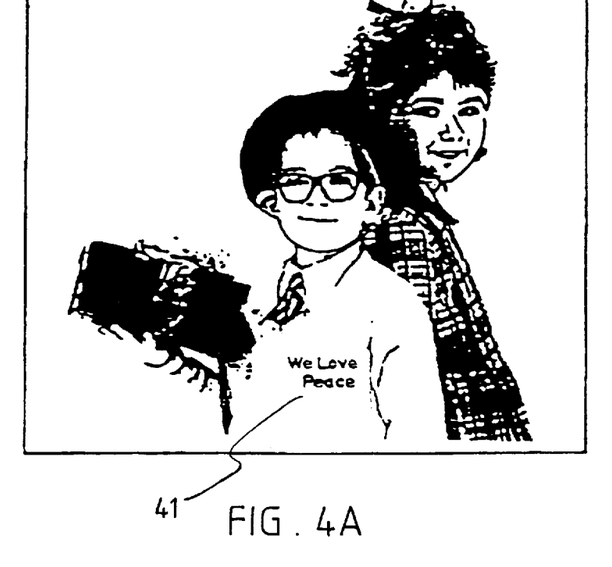
FIG. 4A shows one example of a display of an image including one original sentence.
Figure 4B:
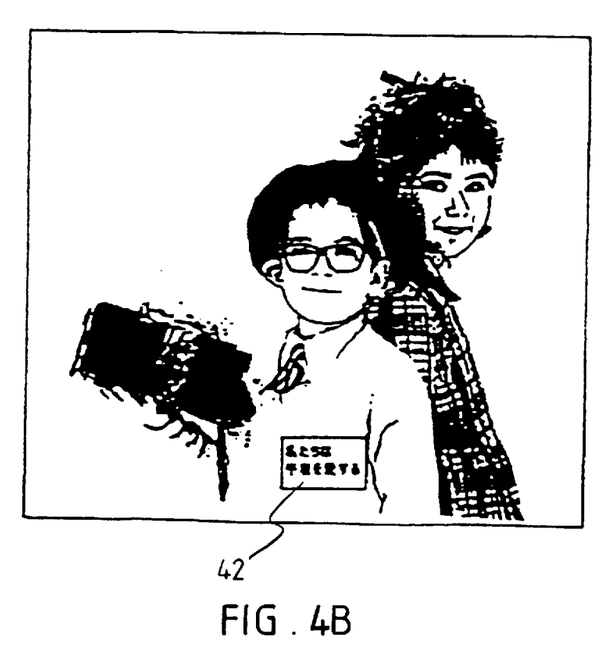
FIG. 4B shows one example of a display situation of the image including one translated sentence.

Next, the processing of the first embodiment of the present invention will be explained. FIG. 2 shows a flow chart of processing of the first embodiment. FIG. 3A shows one example of a display of the original sentence area (English). FIG. 3B shows one example of a display of the original sentence area including the translated sentence area (Japanese). FIG. 4A shows one example of display of the image data including one original sentence (English). FIG. 4B shows one example of image data including one translated sentence (Japanese).

First, as shown in FIG. 3A, the user designates the area of the original sentence to be translated by a window 31. In this case, the first three lines of text are surrounded by the window. This window is moved and resized freely on the display. Therefore, the user can designate his desired original sentence to be translated by moving and resizing the window on the display. The translation area designation section 101 inputs (designates) the translation area according to the user's designation and provides the translation area to the area extraction section 102 (step A01). The area extraction section 102 extracts the content from the translation area in the display memory 102a and checks the type of data of the extracted content (step A02,A03). As shown in FIG. 4A, if the user designates image data including character data 41 to be translated, the type of the extracted data (character data 41) is determined to be image data. In this case, the area extraction section 102 supplies the image data of the characters to the character recognition section 103. On the other hand, as shown in FIG. 3A, if the type of the extracted data is determined to be character code, the area extraction section 102 supplies the character code of the area to the translation section 105. The character recognition section 103 recognizes the image data supplied from the area extraction section 102 (step A04). In short, the character recognition section 103 extracts a character pattern by units of individual characters from the image data, identifies each character by referring to the character recognition knowledge dictionary 104 and outputs the character code (text). The translation section 105 translates the character codes (text data) supplied by the area extraction section 102 or the character recognition section 103, by referring to the translation knowledge dictionary 106 and generates the translated sentence (step A05). The translation display section 107 displays the translated sentence in the designated translation area (step A06). In paticular, the translated sentences are displayed in the designated area instead of the original sentences. For example, as shown in FIG. 3B, the translated sentences (Japanese) are displayed in the window 32 which is same as the user's designated window 31. As shown in FIG. 4B, the translated sentence (Japanese) is displayed in the same position 42 of the original sentence (English) on the display.

Thus, by designating the translation area on the display, the original sentence in the area is translated. Only the original sentence of the designated area among all of the original sentences is translated. Therefore, it does not take a long time from designating the translation area to displaying the translated sentence. Furthermore, the translated sentence is displayed in the area instead of the original sentence. Therefore, it is not necessary for the user to move his viewpoint from the original sentence to the translated sentence on the display.

In the first embodiment, the processing from step A01 to step A06 may be executed in real time. For example, in case the translation area is designated by moving the window on the display, the original sentence in the area corresponding to the moving window is translated in real time and the translated sentence is displayed in each designated area in the sequence of designation.

Figure 5:
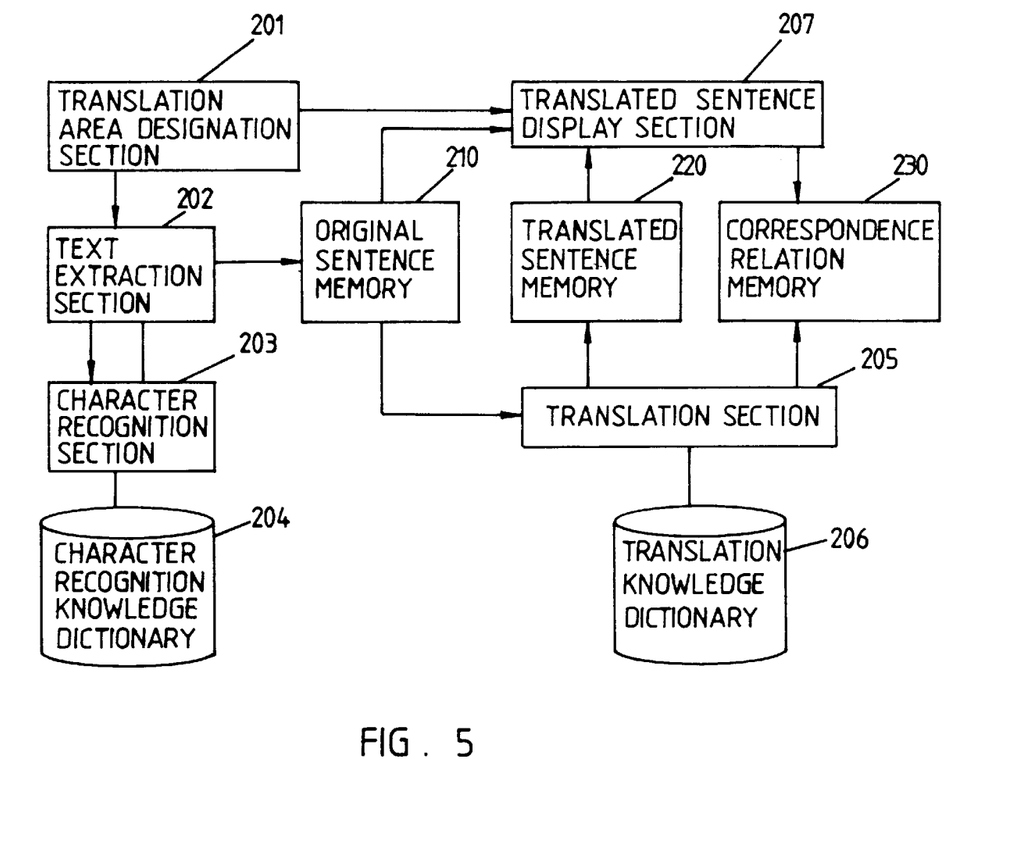
FIG. 5 shows a schematic diagram according to a second embodiment of the present invention.

Next, the second embodiment of the present invention will be explained. FIG. 5 shows a schematic diagram of the translation display apparatus according to the second embodiment of the present invention. As shown in FIG. 5, the translation display apparatus includes a translation area designation section 201, a text extraction section 202, a character recognition section 203, a character recognition knowledge dictionary 204, a translation section 205, a translation knowledge dictionary 206, a translation sentence display section 207, an original sentence memory 210, a translated sentence memory 220 and a correspondence relation memory 230.

The translation area designation section 201 inputs the area of the original sentence from all of the original sentences on the display. For example, the user designates the area through an input device (not shown), i.e., mouse or keyboard. The translation area designation section 201 inputs the area according to the user's designation and supplies the area to the area extraction section 202. The area may be a part of display content (image, text). The text extraction section 202 extracts all original sentences including the area supplied by the translation area designation section 201 and outputs the original sentence-character data of all original sentences to the original sentence memory 210. In short, even if the translation area designation section 201 designates a part of the text data, the text extraction section 202 extracts all text data (all original sentences). In case the translation area designation section 201 designate image data (in both cases of designating a part of the image data or all of the image data), the text extraction section 202 supplies all of the image data to the character recognition section 203 and receives the recognition result from the character recognition section 203. The text extraction section 202 outputs the recognition result as the original sentence-character data to the original sentence memory 210.

The character recognition section 203 extracts the character part (English) from all image data supplied by the text extraction section 202, recognizes the charcter part by referring to the character recognition knowledge dictionary 304 and outputs the recognition result to the text extraction section 202.

The translation section 205 translates the original sentence-character data stored in the original sentence memory 210 into Japanese by referring to the translation knowledge dictionary 206 and outputs the translated sentence to the translation sentence memory 220. In this case, the correspondence relation memory 230 stores correspondence relation information between the original sentence in the original sentence memory 210 and the translated sentence in the translation sentence memory 220.

The translated sentence display section 207 extracts the translated sentence corresponding to the original sentence in the area from the translated sentence memory 220 by referring to the correspondence relation memory 230 and displays the translated sentence in the area instead of the original sentence.

Figure 6A:
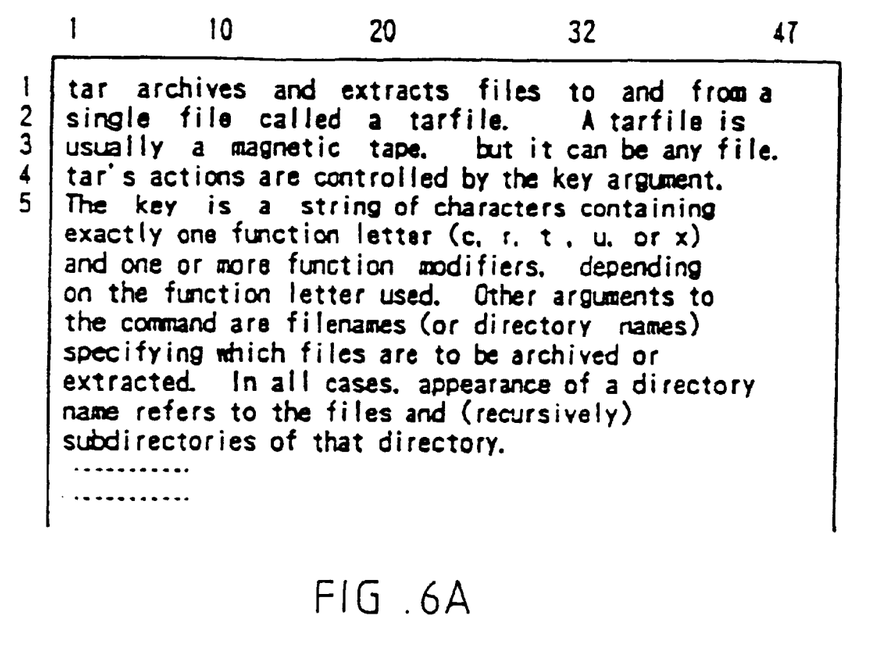
FIG. 6A shows one example of content of an original sentence memory 210 in FIG. 5.
Figure 6B:
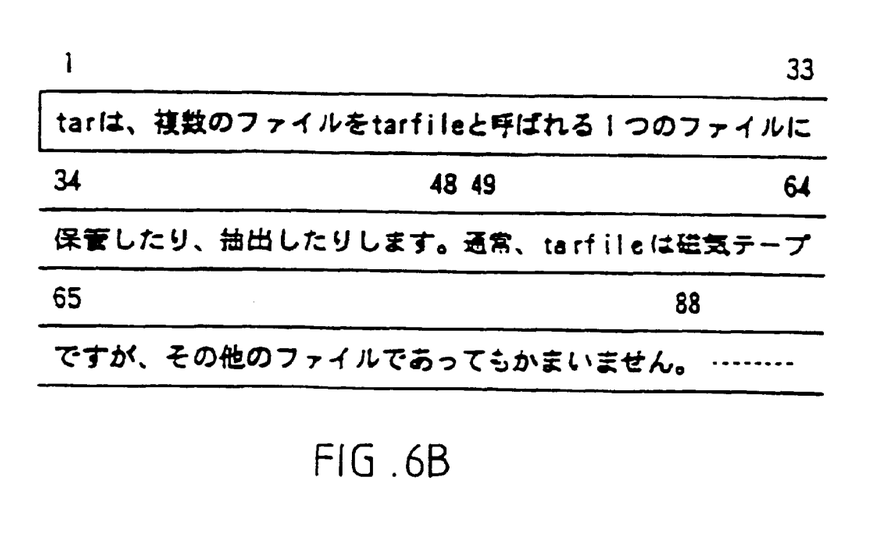
FIG. 6B shows one example of content of a translated sentence memory 220 in FIG. 5.
Figure 6C:
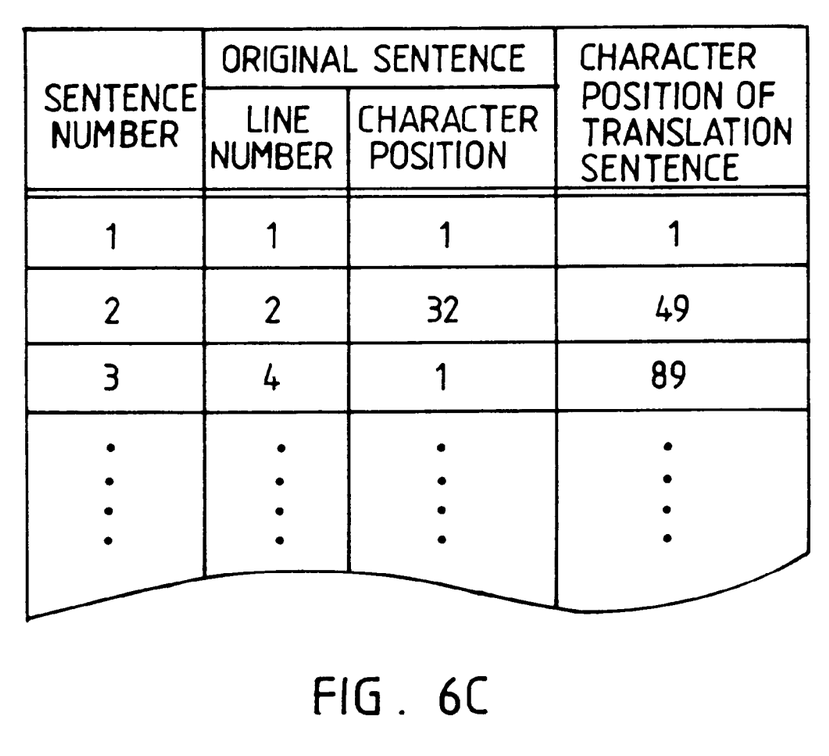
FIG. 6C shows one example of content of a correspondence relation memory 230 in FIG. 5.

FIG. 6A shows the content of the original sentence memory 210. As shown in FIG. 6A, the original sentence-character data is stored line-by-line. FIG. 6B shows the content of the translated sentence memory 220. As shown in FIG. 6B, the translation sentence is stored as a continuous line of character data. As for each translated sentence, a start position and end position are written with the character data as shown in FIG. 6C. FIG. 6C shows the content of the correspondence relation memory 230. As shown in FIG. 6C, the original sentence information and the translated sentence information are stored by unit of sentence number. The sentence number represents a sequential number added to each original sentence stored in the original sentence memory 210. The original sentence information includes a line number and character position of the start point of each original sentence. The translated sentence information includes the character position of the start point of each translated sentence corresponding to the original sentence-number. By referring to the information shown in FIG. 6c, the translated sentence corresponding to the original sentence in the area is retrieved from all of the translated sentences.

Figure 7A:
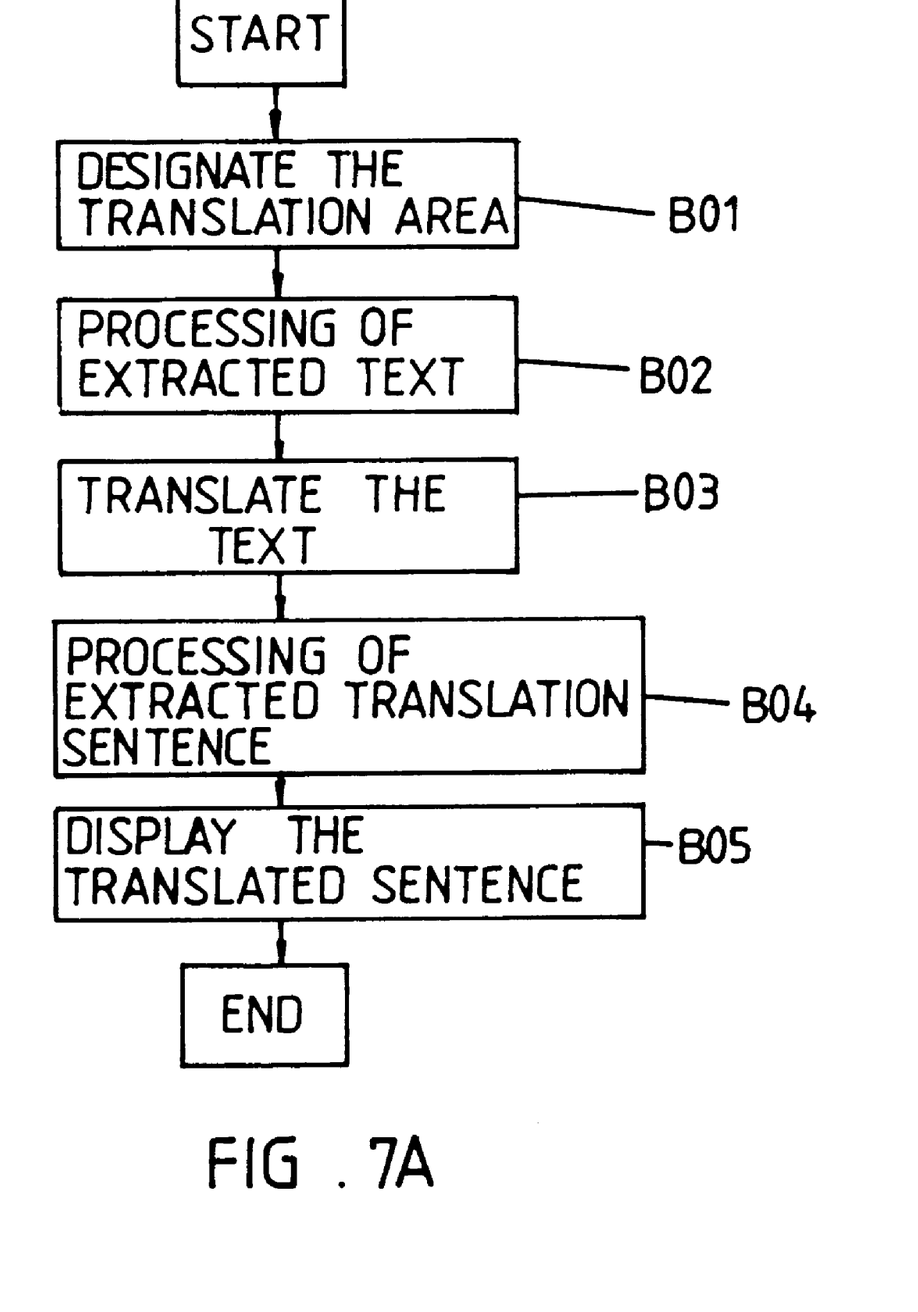
FIG. 7A shows a flow chart of processing according to the second embodiment of the present invention.
Figure 7B:
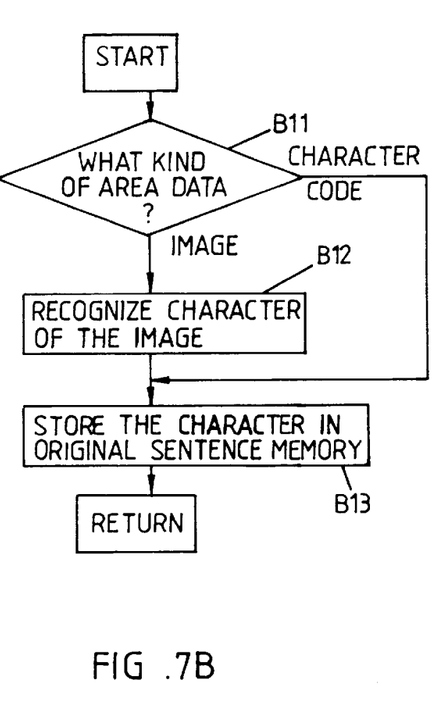
FIG. 7B shows a flow chart of detailed processing of extracting text data in FIG. 7A.
Figure 7C:
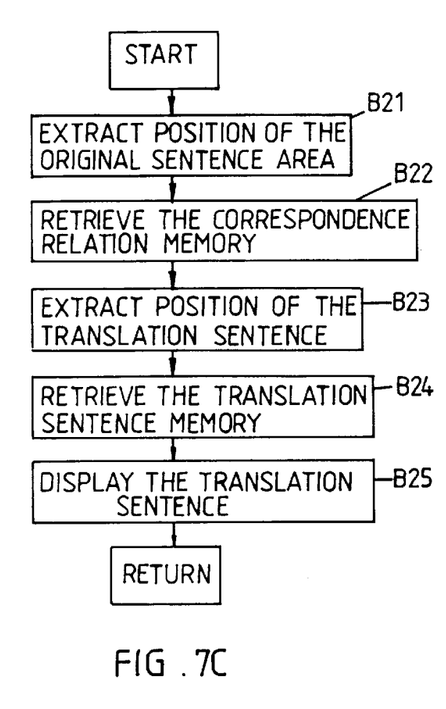
FIG. 7C shows a flow chart of detailed processing of extracting the translated sentence in FIG. 7A.

Next, processing of the second embodiment will be explained. FIG. 7A shows a generic flow chart of processing according to the second embodiment. FIG. 7B shows a flow chart of detailed processing of extracting text data (B02) in FIG. 7A. FIG. 7C shows a flow chart of detailed processing of extracting the translation sentence (B04) in FIG. 7A.

First, the translation area designation section 201 inputs (designates) the translation area according to the user's designation on the display and provides the translation area to the text extraction section 202 (step B01). The text extraction section 202 extracts all of the original sentences including the designated translation area. All of the original sentences are stored in the original sentence memory 210 (step B02). In step B02, the text extraction section 202 checks the type of data in the area (step B11). In the case of image data, the processing is advanced to step B12. In the case of character code (text), the processing is advanced to step B13.

In the case of the character code, the original sentence memory 210 stores all of the character code as original sentence-character data (step B13). In the case of the image data, the text extraction section 202 outputs all of the image data to the character recognition section 203. The character recognition section 203 extracts all of the character part from the image data and recognizes the character part as character code. The character codes as a recognition result are outputted to the text extraction section 202 (step B12). The text extraction section 202 supplies the character codes as the original sentence-character data to the original sentence memory 210 (step B13).

Next, the translation section 205 translates all of the original sentence-character data in the original sentence memory 210 into Japanese (step B03). The translation sentence memory 220 stores the translated sentence as shown in FIG. 6B. In this case, whenever the translation section 205 translates each original sentence and each translated sentence is stored in the translated sentence memory 220, the correspondence relation between the original sentence position in the original sentence memory 210 and the translated sentence position in the translated sentence memory 220 is stored in the correspondence relation memory 230 as shown in FIG. 6C.

The translated sentence display section 207 extracts the translated sentence correponding to the original sentence in the area by referring to the original sentence memory 210, the translated sentence memory 220 and the correspondence relation memory 230 (step B04). The translated sentence is displayed in the area instead of the original sentence. In this case, the translated sentence display section 207 extracts position information (start point, end point) of the area designated by the translation area designation section 201 (step B21). For example, in FIG. 6A, it is assumed that "A tarfile is usually a magnetic tape, but it can be any file." is designated as the area. In this case, the start point of a gramatically complete sentence is "line=2, character position=32", and the end point of the complete sentence is "line=3, character position=47". The translated sentence display section 207 retrieves the sentence number corresponding to the position information from the correspondence relation memory 230 (step B22). In this example, the start point "line=2, character position=32" coincides with the original sentence information of sentence number 2, and the end point "line=3, character position=47" coincides with a position preceding the original sentence information of sentence number 3. Therefore sentence number 2 is retrieved.

Next, the translation sentence display section 207 extracts the character position of the translated sentence of sentence number 2 (step B23). In this example, the start point is "character position=49", and the end point is "character position=88" which is position preceding the start point of the next sentence number 3. The translated sentence display section 207 retrieves the translated sentence from the translated sentence memory 220 in accordance with the character position (step B24). In this example, as show in FIG. 6B, in the translated sentence memory 220, the translated sentence between character position 49 and character position 88 is retrieved. Then, the translated sentence is outputted to the translated sentence display section 207 (step B25). The translated sentence display section 207 displays the translated sentence in the area designated by the translation area designation section 201 (step B05). The display situation is same as that of FIG. 3B or FIG. 4B. In case the length of the translated sentence (Japanese) is larger than the length of the original sentence (English), the character-size or the character-space of the translated sentence is changed in order to display the translated sentence inside the area.

In case the user designates a different area of the original sentence to be translated on the display, all of the translated sentences corresponding to all of the original sentences are already stored in the translated sentence memory 220. Therefore, character-recognition of the character recognition section 203 and translation processing of the translation section 205 are not necessary for a different area of the original sentences. In this case, the translated sentence corresponding to the original sentence of the different area designated by the user is only retrieved according to the processing of FIG. 7C. Then, the translated sentence is displayed in the different area instead of the original sentence.

As discussed mentioned, in the second embodiment, even if one original sentence is designated as the translated area, all of the original sentences are translated in advance. Therefore, if another original sentence is designated as a different translation area, it is not necessary for another original sentence to be translated. The translated sentence corresponding to another original sentence is only retrieved from the original sentence memory 220 and only displayed on the corresponding different translated area instead of another original sentence. Therefore, it is possible to quickly execute the processing in response to the user designating the different translation area to display the translated sentence.

A memory can be used to store instructions for performing the process described above, where such a memory can be CD-ROM, floppy disk or the like.

While first and second embodiments have been illustrated and described in which one sentence is designated for translation and a corresponding translated sentence is displayed in the designated area, the invention is not so limited. The designated area can include more than one sentence for translation, so that the corresponding group of translated sentences will be displayed in the designated area.

Additional advantages and modifications will readily occur to those skilled in the art. The invention in its broader aspects is therefore not limited to the specific details, representative apparatus and method, and illustrative examples shown and described. Accordingly, departures may be made from such details without departing from the spirit or scope of the general inventive concept. Thus, it is intended that this invention cover the modifications and variations of the invention provided they are within the scope of the appended claims and their equivalents.

What is claimed is:

1. Translation display apparatus, comprising:
   display means for displaying a plurality of original sentences of a first language;
   translation area designation means for designating an area of a displayed original sentence to be translated by a window on said display means;
   area extraction means for extracting the original sentences in the window designated by said translation area designation means; and
   translation means for translating the extracted original sentence from the first language to a second language;
   wherein said display means displays the translated sentence over the original sentence in the window.

2. Translation display apparatus according to claim 1, wherein said translation means translates a grammatically complete one of the original sentences extracted by said area extraction means.

3. Translation display apparatus according to claim 1, wherein said area extraction means extracts at least one of text data and image data in accordance with a content of the designated area on the display means.

4. Translation display apparatus according to claim 3, further comprising character recognition means for extracting a character part of image data extracted by said area extraction means, and for recognizing the extracted character part as character code.

5. Translation display apparatus according to claim 1, wherein a size of the window designated by said translation area designation means is adjustable on said display means.

6. Translation display apparatus according to claim 1, wherein a position of the window designated by said translation area designation means is movable or resizable on said display means while the translated sentence corresponding to the extracted original sentence is displayed in the window, and wherein the extracted original sentence is displayed as before when the window to display the translated sentence is moved.

7. Translation display apparatus, comprising:

display means for displaying a plurality of original sentences of a first language;

translation area designation means for designating an area of a displayed original sentence to be translated by a window on said display means;

extraction means for extracting the plurality of original sentences displayed on said display means; and translation means for translating the plurality of original sentences extracted by said extraction means from the first language to a second language;

wherein said extraction means extracts a translated sentence corresponding to one of the original sentences in the window designated by said translation area designation means from all translated sentences translated by said translation means, and wherein said display means displays the extracted translated sentence over the original sentence in the window.

8. Translation display apparatus according to claim 7, wherein said extraction means extracts at least one of text data and image data in accordance with a content of the plurality of original sentences displayed on the display means.

9. Translation display apparatus according to claim 8, further comprising character recognition means for extracting a character part of image data extracted by said extraction means, and for recognizing the extracted character part as character code.

10. Translation display apparatus according to claim 7, wherein a size of the window designated by said translation area designation means is adjustable on said display means.

11. Translation display apparatus according to claim 7, wherein a position of the window designated by said translation area designation means is movable or resizable on said display means while the translated sentence corresponding to the extracted original sentence is displayed in the window, and wherein the extracted original sentence is displayed as before when the window to display the translated sentence is moved.

12. Translation display apparatus according to claim 7, further comprising an original sentence memory for storing the plurality of original sentences extracted by said extraction means;

a translated sentence memory for storing all translated sentences translated by said translation means; and correspondence relation memory for storing correspondence relation information between each of the original sentences in said original sentence memory and a corresponding one of the translated sentences in said translated sentence memory;

wherein said extraction means extracts the translated sentence corresponding to the original sentence in the designated area in accordance with the correspondence relation information in said correspondence relation memory.

13. Translation display apparatus according to claim 12, wherein said correspondence relation information includes a relation between a display position of each of the original sentences on the display means and a memory position of the corresponding translated sentence in the translated sentence memory for each of the original sentences.

14. A method for displaying a translated sentence, comprising the steps of:

displaying a plurality of original sentences of a first language;

designating an area of a displayed original sentence by a window;

extracting the original sentence in the window;

translating the extracted original sentence from the first language to a second language; and displaying the translated sentence over the original sentence in the window.

15. A method for displaying a translated sentence, comprising the steps of:

displaying a plurality of original sentences of a first language;

designating an area of a displayed original sentence by a window;

extracting the displayed plurality of original sentences;

translating the plurality of original sentences extracted at the extracting step from the first language to a second language;

extracting a translated sentence corresponding to the original sentence in the window from all translated sentences translated at the translating step; and displaying the extracted translated sentence over the original sentence in the window.

16. A computer-readable memory comprising:

instruction means for causing a computer to display a plurality of original sentences of a first language;

instruction means for causing a computer to designate an area of a displayed original sentence by a window;

instruction means for causing a computer to extract the original sentence in the window;

instruction means for causing a computer to translate the extracted original sentence from the first language to a second language; and instruction means for causing a computer to display the translated sentence over the original sentence in the window.

17. A computer-readable memory comprising:

instruction means for causing a computer to display a plurality of original sentences of a first language;

instruction means for causing a computer to designate an area of a displayed original sentence by a window;

instruction means for causing a computer to extract the displayed plurality of original sentences;

instruction means for causing a computer to translate the extracted plurality of original sentences from the first language to a second language;

instruction means for causing a computer to extract a translated sentence corresponding to the original sentence in the window from all translated sentences; and instruction means for causing a computer to display the extracted translated sentence over the original sentence in the window.

* * * * *